United States Patent
Peiffer et al.

(10) Patent No.: US 7,231,446 B2
(45) Date of Patent: Jun. 12, 2007

(54) HTTP MULTIPLEXOR/DEMULTIPLEXOR

(75) Inventors: Christopher Peiffer, Menlo Park, CA (US); Israel L'Heureux, Menlo Park, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 718 days.

(21) Appl. No.: 09/975,522

(22) Filed: Oct. 10, 2001

(65) Prior Publication Data

US 2002/0052931 A1 May 2, 2002

Related U.S. Application Data

(63) Continuation-in-part of application No. 09/882,375, filed on Jun. 15, 2001, now abandoned.

(60) Provisional application No. 60/239,552, filed on Oct. 10, 2000.

(51) Int. Cl.
```
G06F 15/16      (2006.01)
G06F 9/46       (2006.01)
H04J 1/16       (2006.01)
H04L 12/26      (2006.01)
H04L 12/56      (2006.01)
G06F 15/173     (2006.01)
G08C 15/00      (2006.01)
H04J 15/00      (2006.01)
H04L 12/28      (2006.01)
```
(52) U.S. Cl. ............... 709/226; 709/202; 709/219; 709/223; 709/227; 718/105; 370/235; 370/237; 370/395.41; 370/916

(58) Field of Classification Search .......... 709/238, 709/203, 245, 230, 217, 202, 219, 223–227; 718/102, 105; 370/231–235, 237, 238, 395.4, 370/395.41, 395.42, 395.43, 916
See application file for complete search history.

(56) References Cited

U.S. PATENT DOCUMENTS

| | | | | |
|---|---|---|---|---|
| 4,698,801 A | * | 10/1987 | Hatano et al. | 370/389 |
| 4,903,823 A | * | 2/1990 | Plesser et al. | 198/845 |
| 5,329,619 A | | 7/1994 | Page et al. | |
| 5,644,718 A | | 7/1997 | Belove et al. | 709/227 |
| 5,678,007 A | | 10/1997 | Hurvig | |
| 5,754,830 A | * | 5/1998 | Butts et al. | 719/311 |

(Continued)

FOREIGN PATENT DOCUMENTS

WO   WO 98/34386   8/1998

(Continued)

OTHER PUBLICATIONS

"RFC 1631", 1994.*

(Continued)

*Primary Examiner*—Jason Cardone
*Assistant Examiner*—Melvin H. Pollack
(74) *Attorney, Agent, or Firm*—Shumaker & Sieffert, P.A.

(57) ABSTRACT

A computer networking system, method and device for multiplexing HTTP requests and demultiplexing HTTP responses. The method may include receiving HTTP requests from a plurality of clients and routing those requests to a socket on a server system. The method may also include receiving HTTP responses from the server system and selectively routing those responses to the corresponding clients.

23 Claims, 5 Drawing Sheets

U.S. PATENT DOCUMENTS

| | | | |
|---|---|---|---|
| 5,774,660 A * | 6/1998 | Brendel et al. | 709/201 |
| 5,826,261 A * | 10/1998 | Spencer | 707/5 |
| 5,918,017 A * | 6/1999 | Attanasio et al. | 709/224 |
| 5,941,988 A | 8/1999 | Bhagwat et al. | |
| 6,003,083 A * | 12/1999 | Davies et al. | 709/226 |
| 6,012,083 A * | 1/2000 | Savitzky et al. | 709/202 |
| 6,070,191 A * | 5/2000 | Narendran et al. | 709/226 |
| 6,078,953 A | 6/2000 | Vaid et al. | |
| 6,098,108 A | 8/2000 | Sridhar et al. | 709/239 |
| 6,104,716 A | 8/2000 | Crichton et al. | 370/401 |
| 6,108,782 A * | 8/2000 | Fletcher et al. | 713/153 |
| 6,115,745 A * | 9/2000 | Berstis et al. | 709/227 |
| 6,128,657 A * | 10/2000 | Okanoya et al. | 709/224 |
| 6,138,162 A | 10/2000 | Pistriotto et al. | |
| 6,175,869 B1 * | 1/2001 | Ahuja et al. | 709/226 |
| 6,195,680 B1 * | 2/2001 | Goldszmidt et al. | 709/203 |
| 6,243,379 B1 | 6/2001 | Veerina et al. | 370/389 |
| 6,252,848 B1 | 6/2001 | Skirmont | 370/229 |
| 6,263,368 B1 * | 7/2001 | Martin | 709/224 |
| 6,266,707 B1 * | 7/2001 | Boden et al. | 709/245 |
| 6,314,463 B1 * | 11/2001 | Abbott et al. | 709/224 |
| 6,324,582 B1 * | 11/2001 | Sridhar et al. | 709/230 |
| 6,363,077 B1 * | 3/2002 | Wong et al. | 370/422 |
| 6,377,975 B1 * | 4/2002 | Florman | 709/203 |
| 6,411,986 B1 | 6/2002 | Susai et al. | 709/203 |
| 6,490,632 B1 * | 12/2002 | Vepa et al. | 709/250 |
| 6,581,090 B1 * | 6/2003 | Lindbo et al. | 709/217 |
| 6,591,298 B1 * | 7/2003 | Spicer et al. | 709/224 |
| 6,614,758 B2 * | 9/2003 | Wong et al. | 370/232 |
| 6,675,216 B1 * | 1/2004 | Quatrano et al. | 709/229 |
| 6,738,813 B1 * | 5/2004 | Reichman | 709/224 |
| 6,754,621 B1 * | 6/2004 | Cunningham et al. | 704/219 |
| 6,779,017 B1 * | 8/2004 | Lamberton et al. | 709/203 |
| 6,779,039 B1 * | 8/2004 | Bommareddy et al. | 709/238 |
| 6,882,623 B1 * | 4/2005 | Goren et al. | 370/230 |
| 6,920,157 B1 * | 7/2005 | Park | 370/535 |
| 6,996,631 B1 * | 2/2006 | Aiken et al. | 709/242 |
| 7,051,066 B1 * | 5/2006 | Albert et al. | 709/202 |
| 2002/0059428 A1 * | 5/2002 | Susai et al. | 709/227 |
| 2004/0037278 A1 * | 2/2004 | Wong et al. | 370/389 |
| 2004/0078284 A1 * | 4/2004 | Musgrove et al. | 705/26 |

FOREIGN PATENT DOCUMENTS

| | | |
|---|---|---|
| WO | WO 98/26559 | 6/1999 |

OTHER PUBLICATIONS

"Hypertext Transfer Protocol—HTTP/1.1", RFC 2616, Fielding et al., Jun. 1999.*

Srisuresh, P. and Gan D. "Load Sharing using IP Network Address Translation (LSNAT)," RFC 2391, Aug. 1998, pp. 1-18.*

Brisco, T. "DNS Support for Load Balancing," RFC 1794, Apr. 1995, pp. 1-7.*

Lottor, M. "TCP Port Service Multiplexer (TCPMUX)," RFC 1078, Nov. 1988, pp. 1-2.*

Cameron, P. et al. "Transport Multiplexing Protocol (TMux)," RFC 1692, Aug. 1994, pp. 1-12.*

Hwang, Se Jin et al. "Virtual Socket Interfaces for Wireless Network," Proceedings, 12th Intl Conference on Information Networking (ICOIN-12), Jan. 21-23, 1998, pp. 381-384.*

Definitions from "Microsoft Computer Dictionary: Fifth Edition," Microsoft Press, 2002. pp. 110, 111, 113, 114, 123, 124, 290, 291, 382, 412, 427, 428, 488, and 513.*

International Preliminary Examination Report, PCT Application No. PCT/US01/31854, mailed Feb. 5, 2003, 4 pgs.

International Search Report, PCT Application No. PCT/US03/09767, mailed Jun. 9, 2003, 4 pgs.

Goldszmidt, German S., "Load Managment for Scaling up Internet Services," Network Operations and Management Symposium, IEEE, vol. 3, Feb. 1998, pp. 828-835.

European Search Report for EP application No. 01983121.3-2211, dated May 15, 2006, 3 pgs.

Examination Report dated Oct. 30, 2006 for corresponding European Application No. 01 983 121.3, 5 pages.

* cited by examiner

HTTP MULTIPLEXOR/DEMULTIPLEXOR

CROSS-REFERENCE TO RELATED APPLICATIONS

This application is a continuation-in-part of U.S. patent application, Ser. No. 09/882,375, entitled "HTTP Multiplexor/Demultiplexor," filed on Jun. 15, 2001, now abandoned, which in turn claims priority from U.S. Provisional Patent Application, Ser. No. 60/239,552, entitled "HTTP Multiplexor/Demultiplexor," filed on Oct. 10, 2000. The disclosures of both these applications are incorporated herein by this reference, in their entirety and for all purposes.

TECHNICAL FIELD

The present invention relates generally to data transmission on computer networks, and more particularly to a networking device including a Hypertext Transfer Protocol (HTTP) Multiplexor/Demultiplexor.

BACKGROUND OF THE INVENTION

The Internet has experienced explosive growth in recent years. The emergence of the World Wide Web has enabled millions of users around the world to easily download web resources containing text, graphics, video, and sound data while at home, work, or from remote locations via wireless devices. These web resources often are large in size and therefore require a long time to download, causing the user delay and frustration. Delay often causes users to abandon the requested web page and move on to another web page, resulting in lost revenue and exposure for many commercial web sites.

One cause of delay is accumulation of Hypertext Transfer Protocol (HTTP) requests within a Transfer Control Protocol (TCP) buffer of a server socket. When a user requests a web page, a web browser sends HTTP requests to a server socket via an established TCP connection. When the server does not process requests to a socket quickly enough, HTTP requests build up in the TCP buffer for that socket, resulting in processing delay in that socket.

An additional cause of delay is socket-related overhead processing. Conventional networking systems open up a server socket for each client that connects to the server, so that server overhead tends to increase in proportion to the number of connected clients. A given server can efficiently handle only so much overhead at once. Accordingly, the one-socket-per-client approach fundamentally limits the number clients that can simultaneously access a server. This limitation is worse still in secure environments, which, due to key exchanges and other security-related considerations, involve even more overhead per socket.

SUMMARY OF THE INVENTION

A system, method and device for multiplexing and demultiplexing HTTP requests and responses are provided. The method may include receiving HTTP requests from a plurality of clients and routing those requests to a single socket on a server system. The HTTP requests may be routed to a particular server socket based on socket response time, the type or size of data being requested, and/or on other parameters related to the HTTP requests. The method may also include receiving HTTP responses from the server system, and selectively routing those responses to corresponding clients.

According to another aspect of the invention, the method typically includes at an intermediate networking device, receiving HTTP requests from multiple originating clients, multiplexing the HTTP requests, and sending the multiplexed HTTP requests to an optimal server socket. The method may further include receiving the HTTP responses from the server system, demultiplexing the HTTP responses, and sending the demultiplexed HTTP responses to corresponding originating clients.

The system typically includes a server system, plural clients configured to connect to the server system via a computer network, and a computer networking device positioned intermediate the server system and the clients on the computer network. The computer networking device typically has an HTTP multiplexor/demultiplexor configured to receive HTTP requests from more than one of the clients and to distribute those requests as a multiplexed transmission to a socket on the server system via a TCP connection.

The device typically includes an HTTP multiplexor/demultiplexor configured to receive HTTP requests from a plurality of clients and to distribute those requests in multiplexed form to a server system via a TCP connection. The device typically is further configured to receive HTTP responses from the server system, demultiplex the responses, and route the demultiplexed responses to corresponding clients.

DETAILED DESCRIPTION OF THE INVENTION

Figure 1:
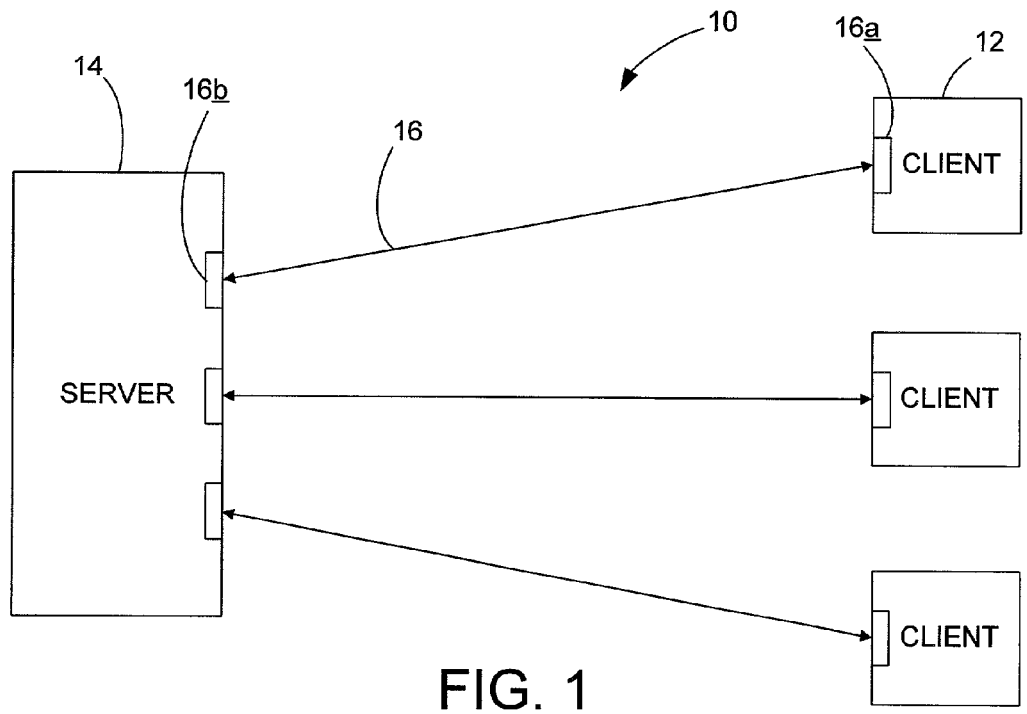
FIG. 1 is a schematic view of a prior art network configuration.

Referring initially to FIG. 1, a prior art networking system is shown generally at 10. System 10 includes a plurality of remote clients 12 and a server 14. In system 10, a single Transport Control Protocol (TCP) connection 16 is established between each remote client 12 and server 14. Each TCP connection 16 is established between a single socket 16a on each remote client and a corresponding socket 16b on server 14, such that a one-to-one socket ratio is established. In other words, one server socket is opened for each connected client. Remote clients 12 send Hypertext Transfer Protocol (HTTP) requests via established TCP connections to a TCP buffer associated with server socket 16b. Requests received at the TCP buffer are processed only as quickly as the server can respond to them. Often, requests build up in the buffer because the server cannot respond to them quickly enough, and server-side delay (also referred to as latency)

often results. This is inefficient and frustrating, and may cause a user to abandon downloading the page.

In addition, each server socket 16b opened requires a certain amount of overhead processing by the server. This overhead processing tends to increase in proportion to the number of sockets that are opened, and thus in proportion to the number of clients connecting to the system. To maintain acceptable response times, the server system must limit the number of client computers that may be connected at any given time, typically by periodically timing out established client connections.

Figure 2:
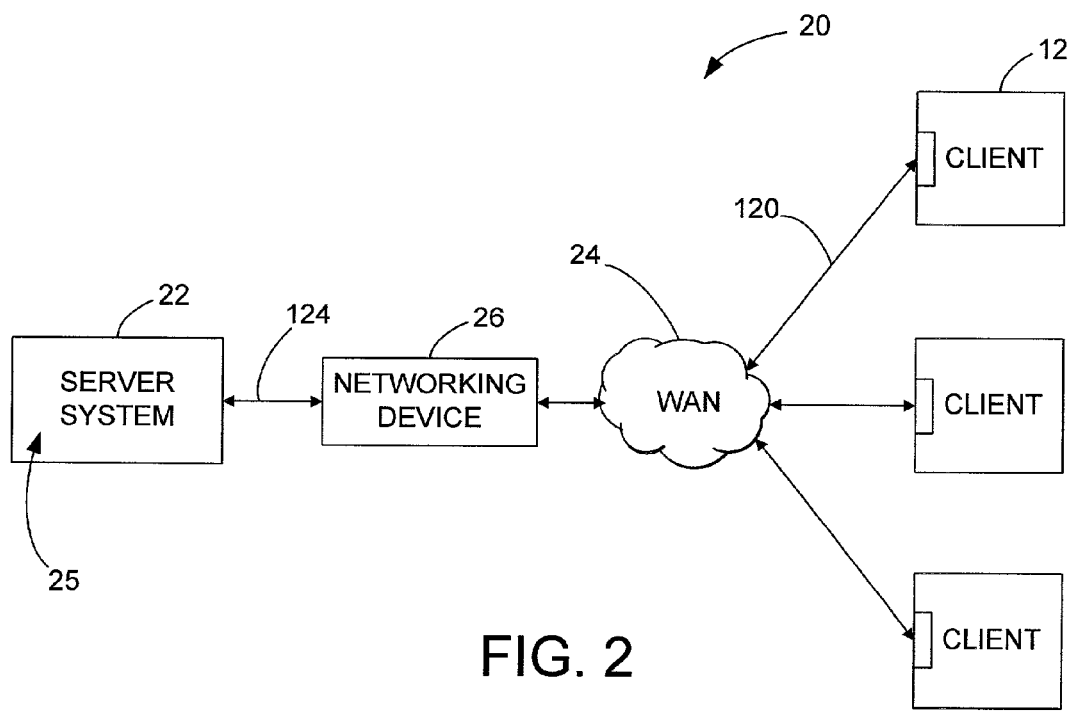
FIG. 2 is a schematic view of a networking device and system according to the present invention, including an HTTP multiplexor/demultiplexor.
Figure 3:
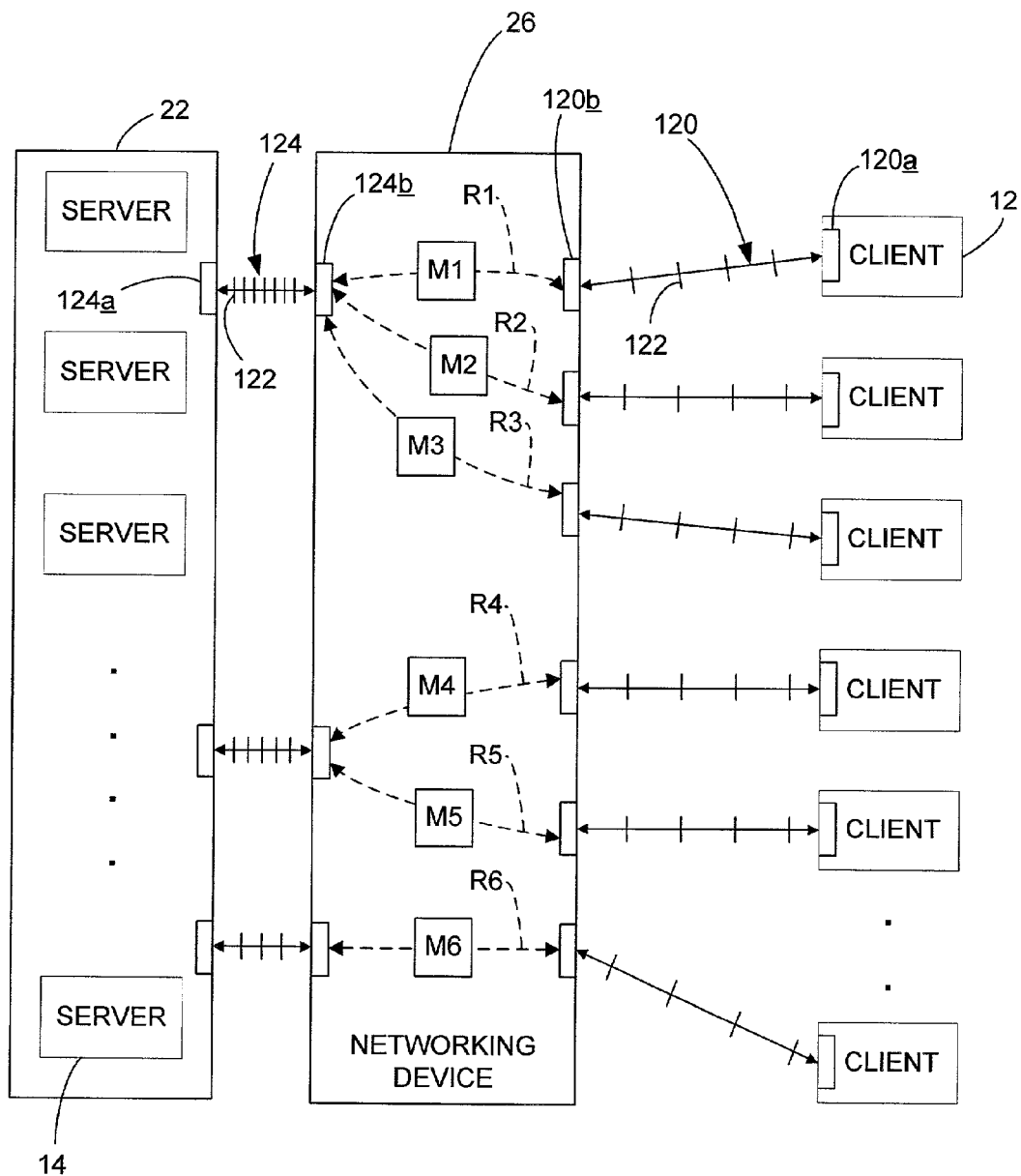
FIG. 3 is a schematic view of the networking device and system of FIG. 2, showing routing, multiplexing and demultiplexing features that the device and system may be configured to perform.

In FIG. 2, a system for processing HTTP requests according to one embodiment of the present invention is shown generally at 20. System 20 typically includes a plurality of remote clients 12 configured to connect with server system 22 via computer network 24 and networking device 26. As seen in FIG. 3, server system 22 may include one or more servers 14, including web servers, applications servers and the like. In a typically employed configuration, server system will host and provide access to a website 25. As will be explained in detail with reference to FIG. 3, connection between clients 12 and server system 22 is established via client TCP connections 120 on the "client side" of networking device 26 and server TCP connections 124 on the "server side" of the networking device. Networking device 26 may include an HTTP multiplexor/demultiplexor, as explained in more detail below, which is configured to route HTTP requests/responses and other network traffic between clients 12 and server system 22. This routing function may be configured to provide for combining or multiplexing traffic received from multiple client connections onto a single connection to the server system. In these implementations, the system typically is also configured to separate, or demultiplex the traffic received along that single server connection, for selective routing and delivery to the appropriate connected clients.

Multiplexing and demultiplexing reduces the amount of server sockets necessary to service a given number of connected clients. The resulting reduction in socket-related overhead processing improves system performance and/or frees resources to allow more clients to connect to the system. In addition, where multiple server sockets are available, the system may be configured to further optimize performance through performance-based selection of server sockets. For example, HTTP requests may be selectively routed to a particular server socket based on optimal response time, in order to ensure efficient processing of the requests. It should be appreciated that the term socket, as used in connection with the present invention, refers to a port, buffer, logical node, or object configured to receive data in HTTP and other formats from a remote device via a network connection, and is not limited to a "socket" as defined in the Unix operating system environment.

Figure 4:
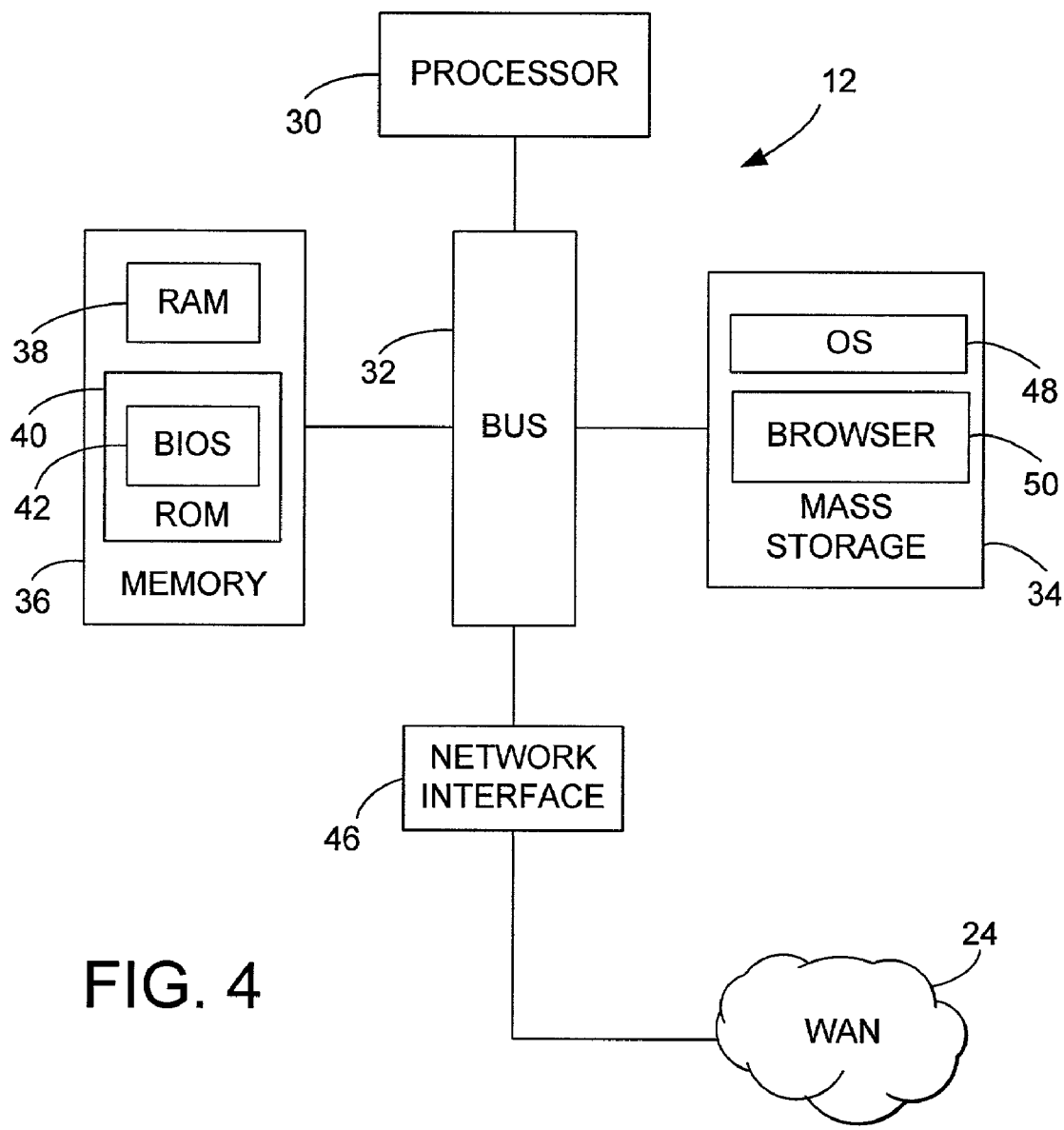
FIG. 4 is a schematic view of a client computing device that may be used with the device and system of FIG. 2.

Referring now to FIG. 4, remote client 12 typically is a personal computer including a processor 30 coupled to a communications bus 32. A mass storage device 34, such as a hard drive, CD ROM drive, tape drive, etc., and a memory 36 are also linked to the communications bus 32. Memory 36 typically includes random access memory (RAM) 38, and read-only memory (ROM) 40. ROM 40 typically includes a basic input/output system (BIOS) 42, which is configured to start up and operate basic functions of the remote client. Remote client 12 typically is configured to access computer network 24 via a network interface 46. Alternatively, remote client 12 may be a portable data assistant, web-enabled wireless device, mainframe computer, or other suitable computing device.

Remote client 12 typically is configured to run an operating system (OS) 48 to manage programs or applications. Operating system 48 is stored in mass storage device 34. Examples of suitable operating systems include UNIX, WINDOWS, MACOS, VMS, and OS/2, although virtually any suitable operating system may be used. Remote client 12 includes a browser program 50 stored in mass storage device 34 configured to display requested web resoures to a user of remote client 12. Exemplary browser programs 50 include the NETSCAPE browser commercially available from Netscape Communications Corporation of Santa Clara, Calif. and the INTERNET EXPLORER browser commercially available from Microsoft Corporation of Redmond, Wash.

Server 14 also typically is a computer similar to that shown in FIG. 4. Server 14 typically includes a server program configured to communicate with remote clients using the HTTP protocol. The server program typically is configured to receive HTTP requests, and, in response send HTTP responses to browser 50 on remote client 12 via computer network 24.

Figure 5:
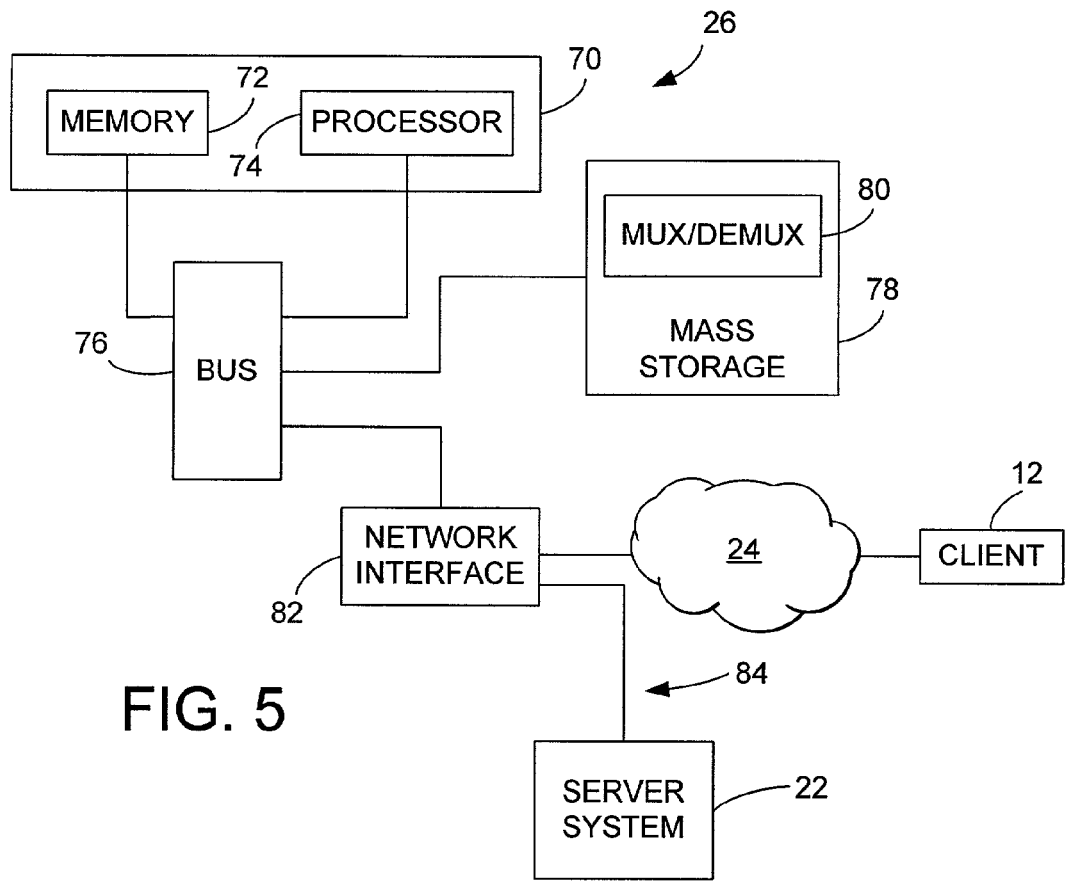
FIG. 5 is a schematic view of one embodiment of the networking device of FIG. 2.
Figure 6:
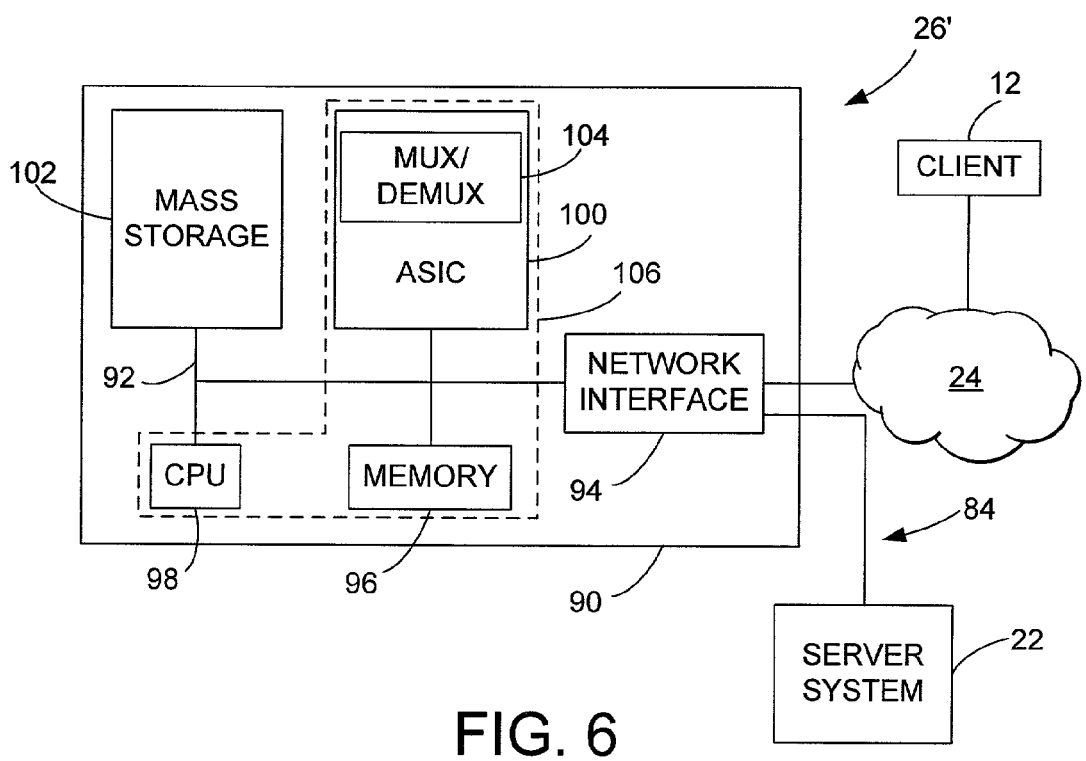
FIG. 6 is a schematic view of another embodiment of the networking device of FIG. 2.

Networking device 26 may be connected to server system 22 and remote clients 12 in various ways. On the client side, device 26 typically is connected to remote clients 12 via a public-type network, such as wide area network (WAN) 24, as seen in FIGS. 5 and 6, which may form part of the Internet. The server-side link between device 26 and server system 22 typically is a private network such as an intranet or local area network (LAN) 84.

Web site 25 typically includes a collection of web resources typically located at a web address called a URL (Uniform Resource Locator), or at another form of URI (Uniform Resource Identifier). The term "web resource" refers generally to a data resource that may be downloaded or accessed by a web browser. Web resources may include web pages, executable code, scripts, graphics, video, sounds, text, and/or other data. Web resources may be static (e.g. stored file) or dynamic (e.g. dynamically generated output). Web resources may be stored on and served by a single server 14 or a number of servers 14. For example, images may be stored on one server while code may be stored in another server, and alternatively, copies of images and code may be stored on multiple redundant servers.

As shown in FIG. 5, networking device 26 typically includes a controller 70 having a memory 72 and processor 74 linked by a bus 76. Also coupled to bus 76 is a mass storage device 78 including a multiplexor/demultiplexor 80, which may also be referred to as a "mux/demux." Networking device 26 also typically includes a network interface 82 coupled to bus 76. Network interface 82 is configured to enable networking device 26 to communicate with client 12 via WAN 24 and with server system 22 via LAN 84. An example of a suitable network interface is the Intel Ethernet Pro 100 network card, commercially available from Intel Corporation of Santa Clara, Calif.

In FIG. 6, another embodiment of a networking device according to the present invention is shown generally at 26'. Networking device 26' typically includes an integrated circuit board 90. The integrated circuit board contains a bus 92 connecting a network interface 94, memory 96, processor 98, Application Specific Integrated Circuit (ASIC) 100, and mass storage device 102. Network interface 94 is configured to enable networking device 26' to communicate with remote client 12 via WAN 24 and with server system 22 via LAN 84. ASIC 100 typically contains a multiplexor/demultiplexor 104. ASIC 100, processor 98, and memory 96 form a controller 106 configured to process requests for web resources according to the methods described below. It will be appreciated that the embodiments of networking device 26, 26' may be a stand-alone network appliance or may be integrated with a web server. Additionally, the mass storage device of networking device 26, 26' is typically Flash memory, ROM, or other form of non-volatile memory, although it will be appreciated that a hard drive or other drive may also be used.

As indicated above, networking device 26 typically is connected to server system 22 via LAN 84. Because the server-side connection is a private-type connection, while the client connections are public-type connections (e.g., WAN 24), networking device 26 may be considered a server-side proxy server. A proxy server is a program or device that acts as an intermediary between a browser and a server. Networking device 26 acts as an intermediary by receiving HTTP requests from remote clients 12 and sending those requests to a socket on server system 22, and by receiving server-generated HTTP responses and sending those responses to the remote client that originated the requests.

The networking devices of the present invention typically are provided with a software or firmware multiplexor/demultiplexor configured to route network traffic between remote clients and a server system. Typically, this is done by multiplexing HTTP requests received at network device 26 via multiple client TCP connections 120, so that those requests may be forwarded from device 26 as a multiplexed transmission to server system 22. This multiplexed transmission normally occurs via a single server TCP connection 124, so that only one socket is opened on the server side. Server system 22 in turn generates HTTP responses corresponding to the various requests of the remote clients 12. These responses are provided along a single server TCP connection 124 to device 26, where they are demultiplexed so that they may be selectively routed and delivered to the appropriate originating client 12.

The above description contemplates routing of all traffic from multiple client TCP connections onto a single server-side TCP connection. Alternatively, as will be seen with reference to FIG. 3, requests and responses may be routed to and from more than one server socket. It is preferable, however, that the number of server sockets used be fewer than the number of client connections, in order to reduce the per-socket overhead occurring on the server side of the system. As indicated above, overhead processing can significantly affect overall performance. One of the advantages of the present system is a reduction of socket-related server overhead, which permits individual servers to handle more client connections.

Referring now to FIG. 3, each remote client 12 has an associated client TCP connection 120 established with networking device 26, typically via a telecommunications network such as WAN 24 (FIG. 2). Each client connection 120 includes a client socket 120a associated with one of client computers 12 and a client-side device socket 120b (or, simply client-side socket 120b) associated with networking device 26. Remote clients 12 are typically configured to send HTTP requests/responses 122 via connections 120.

Server system 22 is coupled with networking device 26 via various server TCP connections 124. Similar to the client side, each server connection 124 includes a server-side device socket 124b (or, simply server-side socket 124b) associated with networking device 26 and a server socket 124a associated with server system 22. As indicated, server system 22 may include a plurality of servers 14 configured to perform various functions. Server connections 124 and their associated sockets may be in a one-to-one relationship with servers 14, or multiple connections 124 may be associated with a given individual server.

The previously described multiplexing, demultiplexing and routing capabilities are more clearly seen with reference to FIG. 3. For, example, with respect to the top three client computers on the right side of the figure, the figure depicts combining (e.g., by multiplexing) the traffic associated with those client computers (e.g., request/response streams R1, R2 and R3) into an individual server TCP connection 124. This allows multiple clients 12 to connect to server system 22 using only one server socket 124a. This provides a significant advantage over conventional client-server connection schemes, which would require three separate server sockets to provide connections for all three clients. By using only one server socket, instead of three, socket-related overhead processing on the server side is reduced, allowing a greater number of connected clients to be serviced at one time.

As indicated, networking device 26 is configured to selectively route HTTP requests and responses between client and server sockets. For example, as indicated by HTTP request/response streams R1, R2 and R3, networking device 26 is configured to receive HTTP requests from one or more of client computers 12, and selectively route those requests via one of server connections 124 to an individual server socket 124a. Networking device is also configured to receive HTTP responses from server system 22, and route those responses back to the appropriate originating client 12.

Networking device 26 may be configured to multiplex requests from multiple clients, for example by taking HTTP requests from multiple clients and routing those requests to server system 22 via a single server connection 124. For example, FIG. 3 depicts multiplexing of HTTP requests from the topmost three clients onto a single server connection 124. The process is typically referred to as multiplexing because the traffic from a number of client-side connections 120 is routed to a smaller number of server-side connections 124, and also because plural client-side connections 120 may be routed to a single server-side connection 124.

Various methods may be used to combine the requests for transmission via a single server-side connection 124. Typically, a multiplexing state agent, shown at M1-M6, is assigned to each client-side socket 120b on the networking device. Each multiplexing state agent is configured to, for each request received from the client, route the request to an optimal server-side socket 124b on the networking device, for transmission to a server 14 of server system 22. When a response to the request is received from the server on the server-side socket 124b, the multiplexing state agent is configured to route the request back to the client-side socket 120b for the requesting client. The multiplexing state agent is free to route subsequent requests from the same client to an optimal server-side socket 124b, whether that be a different server socket, or the same server socket as used for previous requests. While typically each multiplexing state agent is configured to route requests from only one client-side socket 120b to an optimal one of a plurality of server-side sockets 124b, it will be appreciated that alternatively a single multiplexing state agent may be configured to route requests from more than one client-side socket 120b to (1) an optimal one of a plurality of server-side sockets 124b and/or (2) a single server-side socket 124b.

Networking device 26 may be further configured to demultiplex the response stream received from server-side sockets 124b in response to the client requests. Specifically, a series of responses received from a particular server socket is processed by the multiplexing state agents managing transactions with that socket, to unbundle the response stream into discrete responses or streams corresponding to an individual one of clients 12. Each multiplexing agent is configured to detect those responses on the server-side socket 124b that correspond to requests from the client with which the agent is associated, and route the responses back to the originating client, via the client-side socket 120b for the originating client. This process is referred to as demultiplexing because a series of responses from a single server-side connection 124 is broken up and routed over a plurality of client connections 120 to a plurality of clients 12.

As indicated, client-side connections 120 may correspond with server-side connections 124 in various ways. For example, the system may be operated so that all client connections are multiplexed to an individual server connection. Where multiplexing is employed, networking device 26 is configured to multiplex HTTP requests provided from two or more client connections (e.g., the connections corresponding to R1, R2 and R3) into a single server connection, such that only one server socket need be opened. Alternatively, multiple server connections may be employed, where each server connection corresponds either to an individual client connection, or is multiplexed so as to correspond to multiple client connections. In any event, it will normally be desirable that the server connections be fewer in number than the client connections, in order to achieve an optimal reduction of socket-related overhead processing on the server side of the system. Regardless of the particular multiplexing configuration, networking device 26 is further configured to demultiplex the responses generated by server system 22, and cause those responses to be selectively routed to the appropriate originating client 12.

Where multiple server connections are available, various optimization schemes may be employed to reduce delay and otherwise improve performance. In particular, networking device 26 may be configured to route HTTP requests to an optimal server socket, which typically is a least busy server socket. To determine the optimal server socket, multiplexor/demultiplexor 80 (FIG. 5) may be configured to detect the response time at each server socket 124a by monitoring corresponding server-side sockets 124b on the networking device. The server socket with the fastest response time may be determined to be the least busy server socket. Alternatively, or additionally, various sockets may be monitored to determine which server socket has the fewest unfulfilled requests. In addition, routing may be effected based on which of the server sockets was the last to be accessed.

In addition to or instead of the above-described optimization techniques, networking device 26 may be configured to determine the type of request being made and/or the type of data being requested and use that information to effect optimal routing. For example, all image requests may be handled by a predetermined set of sockets on server system 22, while all HTML requests may be handled by a different predetermined set of sockets. In addition, certain sockets may be designated to handle specified protocols or protocol versions. For example, one set of sockets could be designated for all HTTP 1.0 requests, with another set being designated to handle HTTP 1.1 requests.

Regardless of the particular implementation, these optimization techniques increase the overall efficiency and response time of server system 22 by adjusting the flow of requests away from slow, congested server sockets and toward fast congestion-free server sockets. These optimization techniques may be employed in the described networking devices of the present invention, in addition to or instead of the routing, multiplexing and demultiplexing features discussed above.

Typically, the connections between networking device 26, server system 22 and clients 12 (e.g., connections 120 and 124) are persistent TCP connections. Persistent TCP connections are connections that remain open until explicitly commanded to close or until the server times-out the connection. Alternatively, a connection other than a persistent TCP connection may be used. Effective use of persistent connections is a significant advantage of the present invention over prior systems. Often the persistence feature is not used in conventional networking systems, or is only partially used, because of the significant amount of per-connection overhead placed on the system. As discussed above, this overhead fundamentally limits the number of clients that can be connected at any one time. Thus, to provide access to a large number of potential connected clients, many existing systems periodically terminate client connections, to allow others access to the system. This effectively is a disabling of the persistence feature available in newer networking protocols. The failure to leverage persistence is particularly a drawback in secure environments, such as SSL, where setting up and tearing down TCP connections involves key exchanges and other overhead intensive tasks relating to security. By reducing the excessive overhead that necessitates periodic terminating of client connections, networking device is able to establish and maintain persistent connections with clients and servers.

It will be appreciated that the described networking devices and systems are extremely flexible, and may be configured in a nearly limitless number of ways to enhance the performance of client-server networking systems. Other network device implementations are described in co-pending U.S. patent applications Ser. Nos. 09/680,675, 09/680, 997, and 09/680,998, filed Oct. 6, 2000, Nos. 60/239,552 and 60/239,071, filed Oct. 10, 2000, No. 60/287,188, filed Apr. 27, 2001, and No. 60/308,234 filed Jul. 26, 2001, and No. 60/313,006 filed Aug. 16, 2001, the disclosures of each of which are herein incorporated by reference, in their entirety and for all purposes. The features of these devices may variously be implemented in connection with the networking devices and systems of the present invention.

Figure 7:
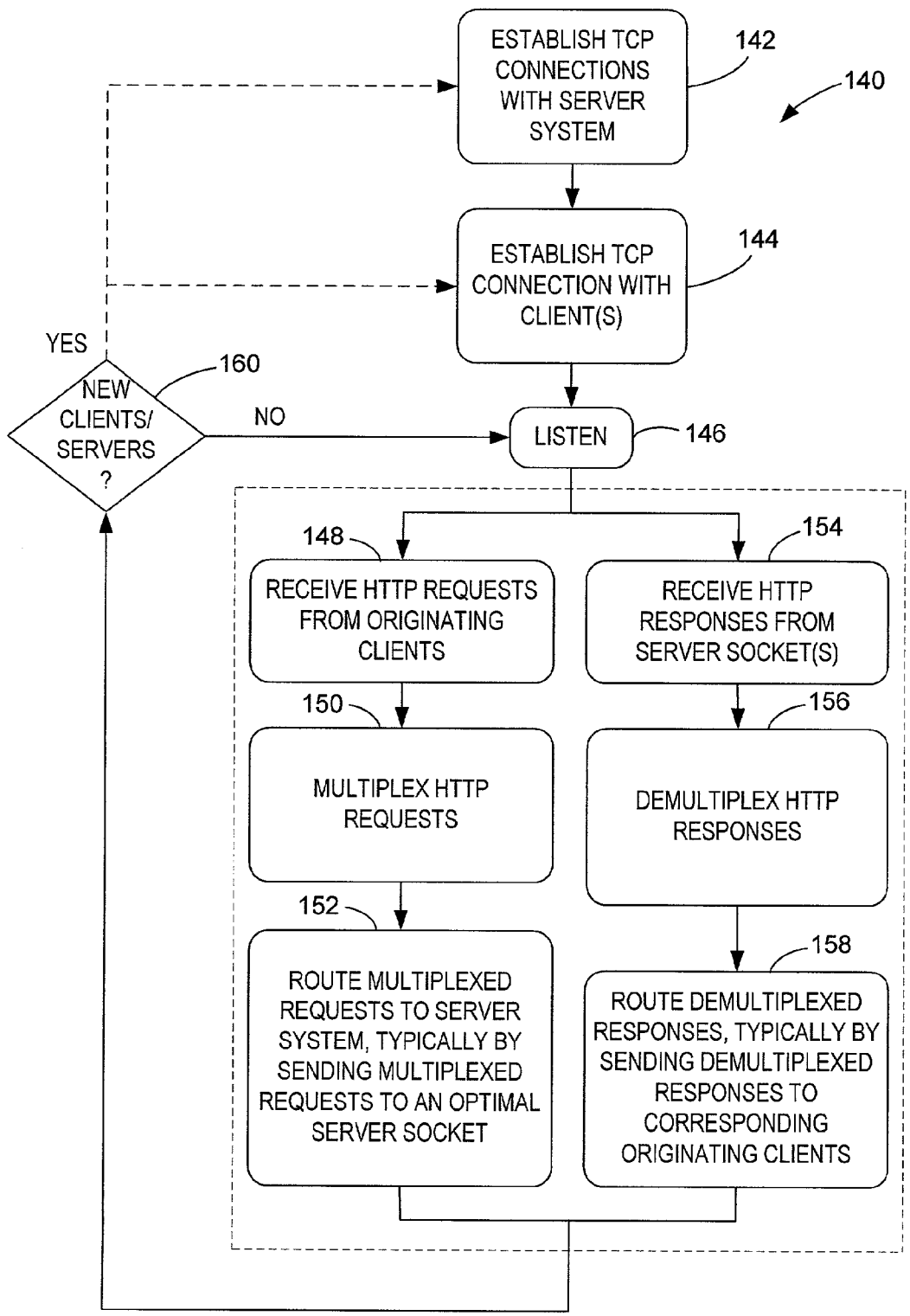
FIG. 7 is a flowchart of a method of demultiplexing and multiplexing HTTP requests and responses according to one embodiment of the present invention.

Turning to FIG. 7, a method 140 may be practiced according to the present invention. The steps of method 140 are typically accomplished by networking device 26, in connection with remote clients 12 and server system 22 communicating via the described network connections. Alternatively, the method may be accomplished by dedicated software on server system 14, or by some other suitable software or hardware device. At 142, the method typically includes establishing persistent TCP connections between networking device 262 and one or more sockets on server system 14. At 144, the method typically includes establishing persistent TCP connections between networking device 26 and one or more remote clients 12. At 146, the method further includes listening for HTTP requests from originating remote clients 12 and/or for HTTP responses from various server sockets.

When HTTP requests are detected at networking device 26, method 140 continues, at 148, with receiving HTTP requests at one or more client-side sockets 120b. Method 100 further includes, at 150, multiplexing HTTP requests so that the multiplexed requests may be transmitted to the server system via a single TCP connection. At 152, the method further includes routing the requests to the server system, typically by sending the multiplexed requests to an optimal server socket.

Prior to step 152, method 140 may also include monitoring server sockets to determine an optimal server socket. The optimal server socket may be determined by identifying a server socket with a least-lengthy response time. Alternatively, the optimal server socket may be determined by determining a last-accessed server socket, determining a server socket with the fewest number of unfulfilled requests, determining the type or size of data being requested or other parameters related to the HTTP requests, or by weighing all or some of these conditions. By determining an optimal server socket, the multiplexor/demultiplexor is able to improve performance by facilitating more efficient use of server resources.

When HTTP responses are detected at the multiplexor/demultiplexor at step 146, method 140 proceeds to 154, and includes receiving HTTP responses from the server system. The multiplexor/demultiplexor typically is configured to determine the destination of the HTTP responses. At 156, the method includes demultiplexing HTTP responses received from server system, in order to permit selective routing and delivery of certain of those responses to the appropriate originating client. At 158, method 140 includes sending the demultiplexed responses to the originating remote client.

When there is a new remote client or server detected at 160, the method includes returning to step 144 to establish a persistent TCP connection with the new remote client, or returning to step 142 to establish a persistent TCP connection with the new server, respectively. It will also be appreciated that networking device 26 may be configured to establish a plurality of TCP connections with a plurality of servers and a plurality of remote clients, and therefore may be configured to handle HTTP requests and HTTP responses from multiple servers and remote clients at once.

Similar to the devices and systems described above, the described method enhances the performance of client-server networking systems. This is accomplished through multiplexing and demultiplexing of HTTP requests/responses, in order to reduce overhead processing that results in conventional systems from opening a server socket for each client computer connecting to the server. This also allows for fuller utilization of the persistent connection features that are now available in connection with HTTP and other protocols. Additionally, or alternatively, the method may include selection of optimal server sockets, in order to further enhance server sufficiency.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

We claim:

1. An intermediate computer networking device for use on a computer network connecting a plurality of clients with a plurality of physical server devices, the clients and physical server devices being configured to communicate using Hypertext Transfer Protocol (HTTP), the intermediate computer networking device comprising:
    an HTTP multiplexor/demultiplexor configured to receive HTTP requests from the plurality of clients via a plurality of client TCP connections from the clients to the intermediate computer networking device, and to monitor response parameters that are specific to individual ones of a plurality of server TCP connections from the intermediate computer networking device to a plurality of corresponding sockets on the physical server devices,
    wherein the HTTP multiplexor/demultiplexor includes a plurality of agents, each agent assigned to a different one of the client TCP connections from the clients to the intermediate computer networking device, and
    wherein upon receiving an HTTP request from the client, the respective agent:
        (1) identifies a single one of the plurality of physical server devices specified as a destination within the HTTP request;
        (2) identifies at least two of the server TCP connections, the at least two identified server TCP connections coupling the intermediate computing device to a plurality of different sockets on the same physical server device specified as the destination within the HTTP request;
        (3) selects one of the identified server TCP connections that couple the intermediate computing device to different sockets on the same physical server device specified as the destination within the HTTP request, wherein the selection is based on the monitored response parameters specific to the different sockets on the physical server device specified as the destination within the HTTP request, and
        (4) routes the HTTP request over the selected one of the server TCP connections that couple the intermediate computing device to the different sockets on the same physical server device specified as the destination within the HTTP request for communication to the physical server device as a multiplexed HTTP request.

2. The computer networking device of claim 1, wherein the multiplexor/demultiplexor is further configured to receive multiplexed HTTP responses from the physical server device over the one of the plurality of sockets on the single physical server device tat corresponds to the selected server TCP connection and to route those responses to the clients via the plurality of client TCP connections.

3. A computer networking method for processing HTTP requests, the method comprising:
    monitoring a plurality of server TCP connections from an intermediate computer networking device to a plurality of corresponding sockets on a single plurality of physical server devices to determine a response parameter that is specific to each of the server TCP connections;
    receiving HTTP requests from a plurality of originating clients;
    identifying a single one of the plurality of physical server devices specified as a destination within the HTTP requests;
    identifying at least two of the server TCP connections, the at least two identified server TCP connections coupling the intermediate computing device to a plurality of different sockets on the same physical server device specified as the destination within the HTTP requests;
    selecting one of the identified server TCP connections that couple the intermediate computing device to different sockets on the same physical server device specified as the destination within the HTTP request, wherein the selection is based on the determined response parameter for each of the identified server TCP connections;
    routing the HTTP requests to one of the sockets on the physical server device specified as the destination within the HTTP requests, the socket corresponding to the selected server TCP connection, via a multiplexed TCP transmission using the selected server TCP connection.

4. The method of claim 3, wherein the response parameter is selected from the group consisting of least-lengthy response time, last-accessed socket, fewest number of unfulfilled requests, type of requested data, and size of requested data.

5. The method of claim 3, further comprising:
receiving HTTP responses from the physical server device specified as the destination within the HTTP requests via the selected server TCP connection; and
selectively routing the HTTP responses to the plurality of originating clients.

6. A computer networking method for data transfer between plural originating clients, a plurality of physical server devices, and a networking device positioned on a computer network intermediate the clients and the physical server devices, the method comprising:
at the intermediate networking device,
monitoring a plurality of server TCP connections from the intermediate networking device to a plurality of corresponding sockets on the plurality of physical server devices to determine response parameters that are specific to each of the server TCP connections;
listening for HTTP requests from the originating clients;
receiving HTTP requests from more than one of the originating clients;
identifying single one of the plurality of physical server devices specified as a destination within the HTTP requests;
identifying least two of the server TCP connections, the at least two identified server TCP connections coupling the intermediate computing device to a plurality of different sockets on the same physical server device specified as the destination within the HTTP requests;
selecting one of the server TCP connections that couple the intermediate computing device to different sockets on the same physical server device specified as the destination within the HTTP requests, wherein the selection is based on the determined response parameter for each of the server TCP connections from the intermediate device to different sockets on the physical server device specified as the destination within the HTTP requests;
multiplexing the received requests for delivery to the physical server device specified as the destination within the HTTP requests via the selected server TCP connection; and
sending the received requests via the selected server TCP connection to an optimal one of the server sockets on the physical server device specified as the destination within the HTTP requests, the optimal socket corresponding to the server TCP connection selected based on the determined response parameter.

7. The method of claim 6, wherein receiving HTTP requests from the originating clients occurs via client TCP connections.

8. The method of claim 6, wherein the plurality of server TCP connections from the intermediate device to corresponding sockets on the physical server devices are persistent.

9. The method of claim 6, wherein the response parameter comprises a least-lengthy response time.

10. The method of claim 6, wherein the response parameter comprises a last-accessed server socket.

11. The method of claim 6, wherein the response parameter comprises the fewest number of unfulfilled requests.

12. The method of claim 6, further comprising listening for multiplexed HTTP responses from the optimal server socket.

13. The method of claim 12, further comprising receiving HTTP responses from the optimal server socket.

14. The method of claim 13, further comprising demultiplexing the received HTTP responses to permit selective routing and transmission of the received responses to corresponding originating clients.

15. The method of claim 14, further comprising sending the HTTP responses to the corresponding originating clients.

16. A computer networking method for data transfer between plural originating clients, a plurality of physical server devices and an intermediate networking device, wherein the originating clients and the servers are configured to communicate over a computer network via the intermediate networking device, the method comprising:
at the intermediate networking device,
monitoring a plurality of server TCP connections from the intermediate networking device to a plurality of corresponding server sockets on the plurality of physical server devices to determine a response parameter that is specific to each individual one of the server TCP connections;
listening for HTTP requests from the originating clients;
receiving HTTP requests from more than one of the originating clients;
identifying a single one of the plurality of physical server devices specified as a destination within the HTTP requests;
identifying at least two of the server TCP connections, the at least two identified server TCP connections coupling the intermediate computing device to a plurality of different sockets on the same physical server device specified as the destination within the HTTP requests;
multiplexing the received requests;
determining an optimal one of the plurality of different server sockets on the physical server device specified as the destination within the HTTP requests based on the determined response parameter determined by monitoring the corresponding plurality of server TCP connections from the intermediate device to the plurality of server sockets on the physical server device;
sending the received requests as a multiplexed transmission to the optimal one of the plurality of server sockets on the physical server device specified as the destination within the HTTP requests via an individual one of the plurality of server TCP connections that corresponds to the optimal server socket;
listening for HTTP responses from the physical server device;
receiving HTTP responses from the physical server device;
demultiplexing the HTTP responses received from the physical server device to permit selective routing and transmission to corresponding originating clients; and
sending the received HTTP responses to the corresponding originating clients.

17. A computer networking device for use on a computer network to improve data transfer, the computer networking device being positioned intermediate plural clients and a plurality of physical server devices, the clients and physical server devices being configured to communicate via the computer network using HTTP communication protocol, the intermediate computer networking device comprising:

an HTTP multiplexor/demultiplexor configured to receive HTTP requests from the clients via a plurality of client TCP connections from the clients to the intermediate computer networking device, and to monitor response parameters that are specific to individual ones of a plurality of server TCP connections from the intermediate computer networking device to a plurality of corresponding sockets on the physical server devices, wherein the HTTP multiplexor/demultiplexor includes a plurality of agents, each agent assigned to a different one of the client TOP connections from the clients to the intermediate computer networking device, and wherein upon receiving an HTTP request from the client the respective agent:

(1) identifies a single one of the plurality of physical server devices specified as a destination within the HTTP request;

(2) identifies at least two of the server TCP connections, the at least two identified server TCP connections coupling the intermediate computing device to a plurality of different sockets on the same physical server device specified as the destination within the HTTP request;

(3) selects one of the identified server TCP connections that couple the intermediate computing device to different sockets on the same physical server device specified as the destination within the HTTP request wherein the selection is based on the monitored response parameters specific to the plurality of different sockets on the physical server device specified as the destination within the HTTP request; and (4) routes the HTTP request over the selected one of the server TCP connections that couple the intermediate computer networking device to the different sockets on the same physical server device specified as the destination within the HTTP request, and wherein the computer networking device is further configured to receive HTTP responses from the physical server device specified as the destination within the HTTP request, and route the received HTTP responses to a corresponding one of the clients.

18. The device of claim 17, wherein the server TCP connections from the intermediate computer networking device to the plurality of corresponding sockets on the plurality of physical servers are persistent.

19. The device of claim 17, wherein the respective agent selects one of the identified server TCP connections by identifying the one of the identified server TCP connections from the intermediate computer networking device to the plurality of corresponding sockets on the physical server device specified as the destination within the HTTP request having the least-lengthy response time based on the monitoring.

20. A computer networking system for use with a computer network, they system comprising:
a plurality of physical server devices;
plurality clients configured to connect to the physical server devices via the computer network; and
a computer networking device positioned intermediate the physical server devices and the clients on the computer network;
wherein the intermediate computer networking device is configured to monitor response parameters that are specific to individual ones of a plurality of server TCP connections from the computer networking device to a plurality of corresponding server sockets on the physical server devices, and wherein the computer networking device comprises a plurality of agents, each agent assigned to a different one of a plurality of client TCP connections from the computer networking device to the clients, and wherein the agents:

(1) receive HTTP requests from the clients, (2) identify a single one of the plurality of physical server devices specified as a destination within the HTTP requests;

(3) identify at least two of the server TCP connections, the at least two identified server TCP connections coupling the intermediate computer networking device to a plurality of different sockets on the same physical server device specified as the destination within the HTTP request, (4) select one or more of the identified server TCP connections that couple the intermediate computing device to different sockets on the same physical server device specified as the destination within the HTTP request, wherein the selection is based on the monitored response parameters specific to the plurality of different sockets on the physical server device specified as the destination within the HTTP request, and (5) distribute the received HTTP requests via multiplexed transmission to one or more of the plurality of server sockets on the physical server device specified as the destination within the HTTP request over the one or more selected server TCP connections.

21. The computer networking system of claim 20, wherein the computer networking device is further configured to receive HTTP responses from the physical server device specified as the destination within the HTTP request via a multiplexed transmission, demultiplex the responses, and route the multiplexed responses to corresponding clients via the plurality of client TCP connections.

22. An intermediate computer networking device for improving data transfer via a computer network, the intermediate computer networking device being configured to monitor a plurality of persistent server socket connections from the intermediate computer networking device to a plurality of physical server devices to determine a response parameter that is specific to each of the server socket connections, receive HTTP requests from a client, identify a single one of the plurality of physical server devices specified as a destination within the HTTP request, identify at least two of the server socket connections, the at least two identified server socket connections coupling the intermediate computer networking device to a plurality of different sockets on the same physical server device specified as the destination within the HTTP request, determine an optimal one of the identified server socket connections from the intermediate computer networking device to the physical server device specified as the destination within the HTTP request for each HTTP request based on the respective response parameters for each of the server socket connections, and send each HTTP request to the determined optimal one of the plurality of server socket connections from the intermediate computer networking device to the physical server device specified as the destination within the request via a multiplexed TCP transmission.

23. The device of claim 22, wherein the device is further configured to receive an HTTP response from the optimal server socket and to send the HTTP response to the client.

* * * * *